Feb. 20, 1934. E. GATHMANN Re. 19,086

APPARATUS FOR STRIPPING INGOTS FROM INGOT MOLDS

Original Filed Oct. 6, 1931 3 Sheets-Sheet 1

Inventor,
Emil Gathmann
By Baldwin & Wight
his Attorneys.

Feb. 20, 1934. E. GATHMANN Re. 19,086
APPARATUS FOR STRIPPING INGOTS FROM INGOT MOLDS
Original Filed Oct. 6, 1931 3 Sheets-Sheet 2
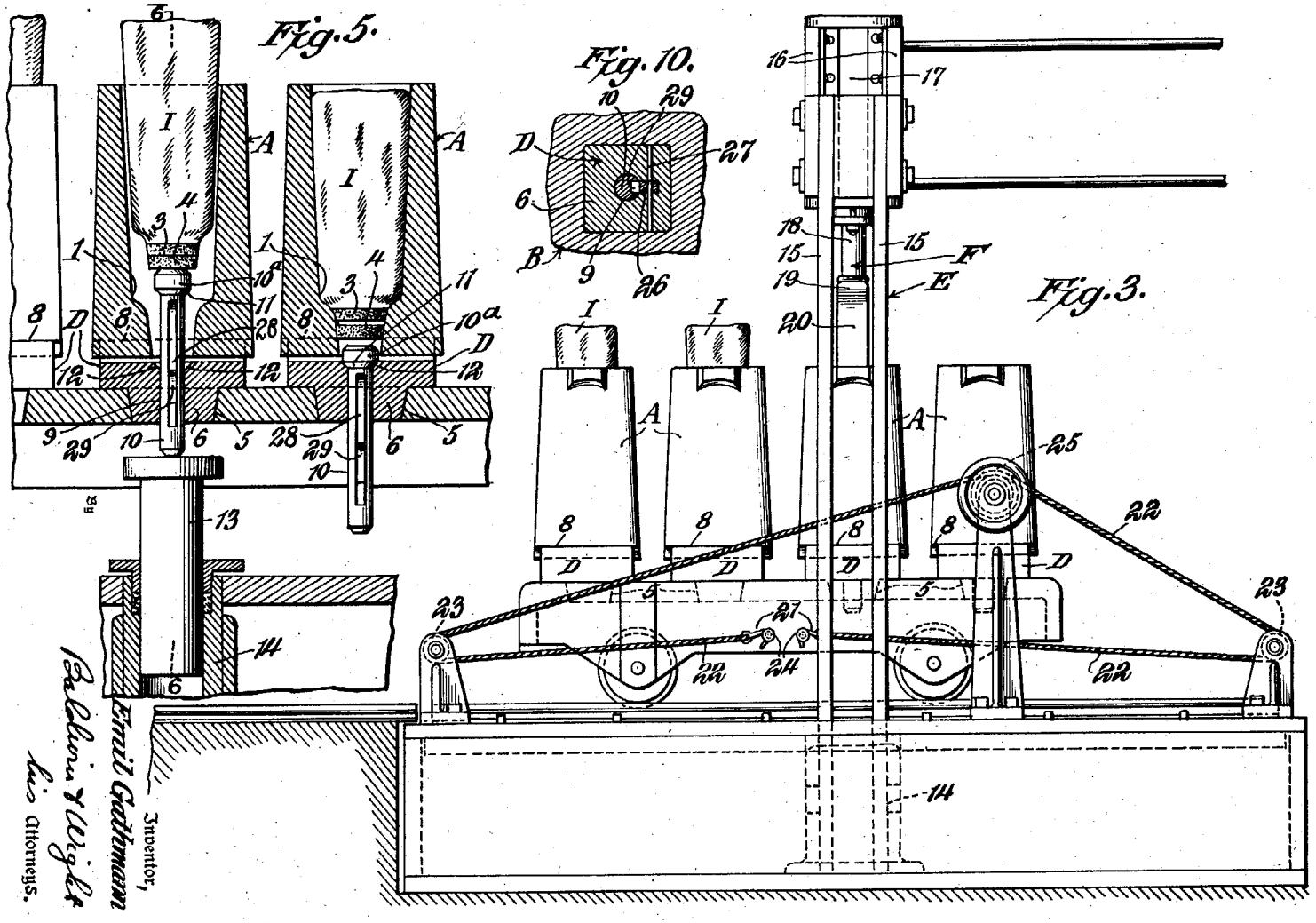

Feb. 20, 1934. E. GATHMANN Re. 19,086
APPARATUS FOR STRIPPING INGOTS FROM INGOT MOLDS
Original Filed Oct. 6, 1931 3 Sheets-Sheet 3
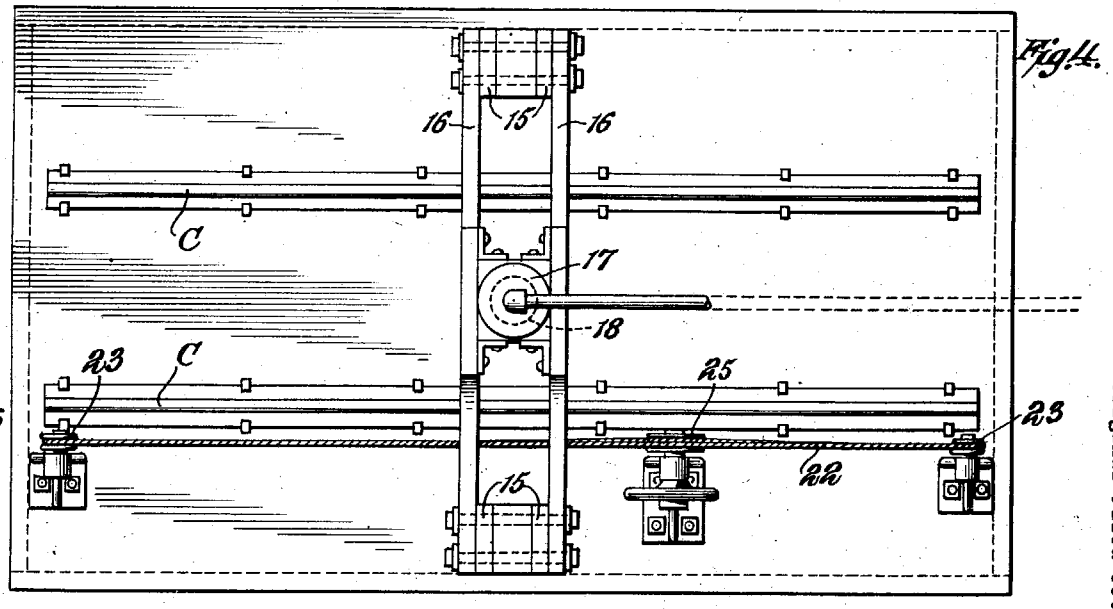
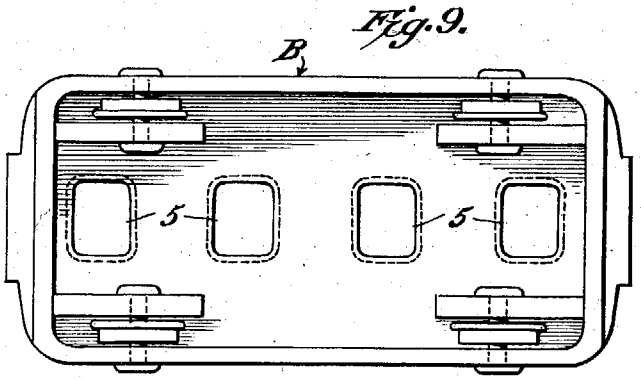
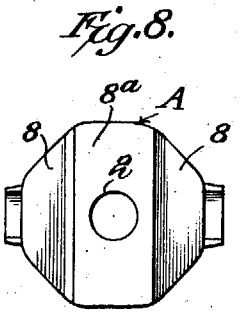
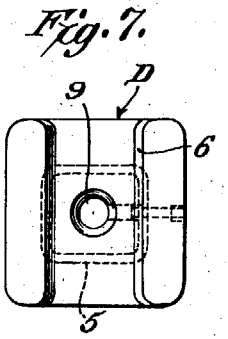
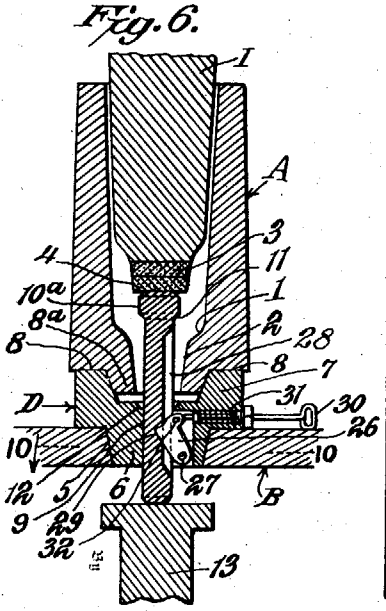
Inventor,
Emil Gathmann
Baldwin & Wight
his Attorneys.

Reissued Feb. 20, 1934 Re. 19,086

UNITED STATES PATENT OFFICE 19,086

APPARATUS FOR STRIPPING INGOTS FROM INGOT MOLDS

Emil Gathmann, Baltimore, Md.

Original No. 1,897,696 dated February 14, 1933, Serial No. 567,281, October 6, 1931. Application for reissue November 25, 1933. Serial No. 699,761

18 Claims. (Cl. 22—95)

This application is a continuation in part of my copending application Serial Number 486,463 for Apparatus for stripping ingots from ingot molds, filed October 4, 1930, which application has matured into Patent 1,890,777, issued December 13, 1932.

This invention relates to methods of and apparatus for stripping ingots from ingot molds and more particularly to an improved method of and apparatus for stripping ingots from molds having chambers larger in cross section at the top than at the bottom, such, for example, as the kind of mold now well known in the art as the Gathmann big-end-up mold.

In commercial production of metal ingots it is the usual practice to place the molds into which a "heat" is to be poured on cars and then to fill or teem the molds with molten metal in the vicinity of the melting furnace. After the molds have been teemed, the cars with the molds thereon are moved to another part of the plant in which the ingots, having by this time solidified, are "stripped" or removed from the molds and then placed in a soaking pit for equalizing and, in some cases, raising the temperature of the ingot metal preparatory to subsequent working of the ingot.

Steel ingots are produced from either fully deoxidized, semi-deoxidized, or "open" steel in accordance with the requirements of the product to be made or the practice of the particular plant or both. The best ingots obtainable from each of these kinds of steel are those cast in big-end-up molds. Ingots cast in such molds from fully deoxidized steel are generally provided with shrink head portions which are confined within hot tops of refractory material while the ingots are solidifying. After such an ingot has solidified, the hot-top may be broken away and the shrink head portion of the ingot then gripped by suitable tongs or the like and the entire ingot lifted from the mold while the latter is clamped down or otherwise held stationary. Before lifting an ingot from such a mold in this way it is usually necessary to first loosen the ingot to facilitate its withdrawal.

Ingots cast in big-end-up molds from semi-deoxidized or from "open" steel are normally not provided with a shrink head portion so that, after such an ingot has been cast, no part of the ingot projects above the mold proper and it is therefore not possible to merely grip the ingot and lift it from the mold as is the case with a big-end-up ingot having a shink head portion.

Prior to the present invention, the practice most generally used in stripping ingots cast without a shrink head portion from big-end-up molds has been to "up-end" or invert the mold and contained ingot, then to loosen the ingot from the mold when necessary as by jarring the latter, and then to lift the inverted mold off the ingot, the latter remaining on the stool, table, or floor upon which it was placed when inverted. This "up-ending" practice heretofore generally resorted to necessarily results in much delay and high costs of handling of the ingot so that the big-end-up ingot has not heretofore been produced from semi-deoxidized or from "open" steel commercially in any considerable tonnage despite the fact that, as stated above, the best ingots obtainable from these kinds of steel are those produced in big-end-up molds. In my United States Patent Nos. 1,059,667 and 1,059,668, issued April 22, 1913, I have disclosed methods of and apparatus for stripping ingots cast without shrink head portions in big-end-up molds without inverting or up-ending the molds. The present invention embodies improvements in the apparatus shown and described in the aforesaid patents, these improvements resulting in more efficient and rapid stripping of the ingots, and being particularly adapted for use in connection with the improved Gathmann big-end-up molds now used. Although my improved apparatus is especially useful in facilitating the stripping of ingots cast without shrink head portions, it may also be used to advantage in stripping ingots cast with a shrink head portion for reasons to be hereinafter pointed out.

The primary object of my invention is to provide an improved apparatus for efficiently stripping a big-end-up ingot from the mold in which it is cast. A further object is to provide an improved method of stripping ingots from big-end-up molds. In accordance with my invention, I employ big-end-up molds of the kind having a bottom opening which is closed by a suitable closure device. Preferably the molds used are each provided with a double closure means comprising two plugs of refractory material of the kind shown in my U. S. Patent No. 1,660,037, issued February 21, 1928, the plugs, in accordance with the present invention, being arranged in vertically spaced relation within the mold bottom opening. Prior to teeming a jag of molds, I position one or more molds on a support which is preferably a car readily movable from the teeming place to the stripping location. This car or support is provided with one or more stools each having a vertically reciprocable stripper rod arranged above or adapted to be positioned above a device for raising the stripper rod, preferably comprising a cylinder having a fluid pressure-actuated ram adapted to engage and lift the stripper rod. I so construct the stripper rod that its upper end is of somewhat smaller diameter than the opening in the bottom of the mold and so that it will project somewhat above the top surface of the support when the rod is in inactive or normal position. This projecting upper end of the stripper rod may be readily seen through the mold bottom opening when the mold is being positioned on the car prior to teeming, and thus serves advantageously as a means for accurately centering the mold with respect to the stripping rod. When one or more molds have been positioned upon the car in this way, their bottom openings are closed, preferably by means of the double-closure referred to above. The molds are then teemed and moved to the stripping location.

An improved device is provided for holding the molds to be stripped against vertical movement during the stripping operation, this device, in general, comprising an inverted U-shaped member mounted for downward movement into engagement with the top face of the mold on opposite sides thereof. An important feature of the invention consists in the provision of means for accurately locating or "spotting" the car above the power ram, the at present preferred form of such means including a cable looped around spaced pulleys and being connectible to the car for moving the latter under accurate control of the operator. After the car has been accurately "spotted" to position the stripper rod of any particular mold over the power ram, the holding device is moved down into engagement with the face of the mold. The ram is then operated to raise the stripper rod and ingot until the upper end of the latter is projected somewhat above the mold top, and the stripper rod is locked in its raised position. The U-shaped holding device is then moved upwardly to release the mold, and the car then moved to the desired location where the final stripping operation is performed.

A practical embodiment of the invention is illustrated in the accompanying drawings, in which:

Figure 3 is a view in side elevation thereof;

Figure 4 is a top plan view of a mold holding device and car positioning means;

Figure 5 is a fragmentary vertical sectional view taken on the line 5—5 of Figure 1;

Figure 6 is a fragmentary vertical sectional view taken on the line 6—6 of Figure 5;

Figure 7 is a top plan view of a mold stool;

Figure 8 is a bottom plan view of a mold;

Figure 9 is a bottom plan view of a mold supporting car; and

Figure 10 is a horizontal sectional view of a mold stool taken on the line 10—10 of Figure 6.

Figure 2:
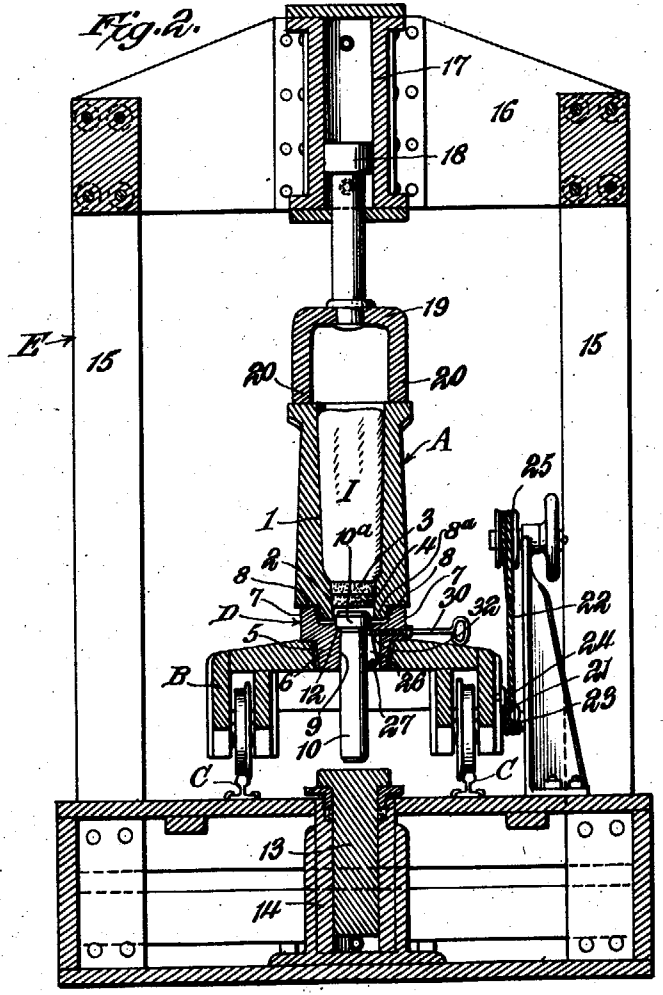
Figure 2 is a central vertical sectional view of the apparatus shown in Figure 1.
Figure 1:
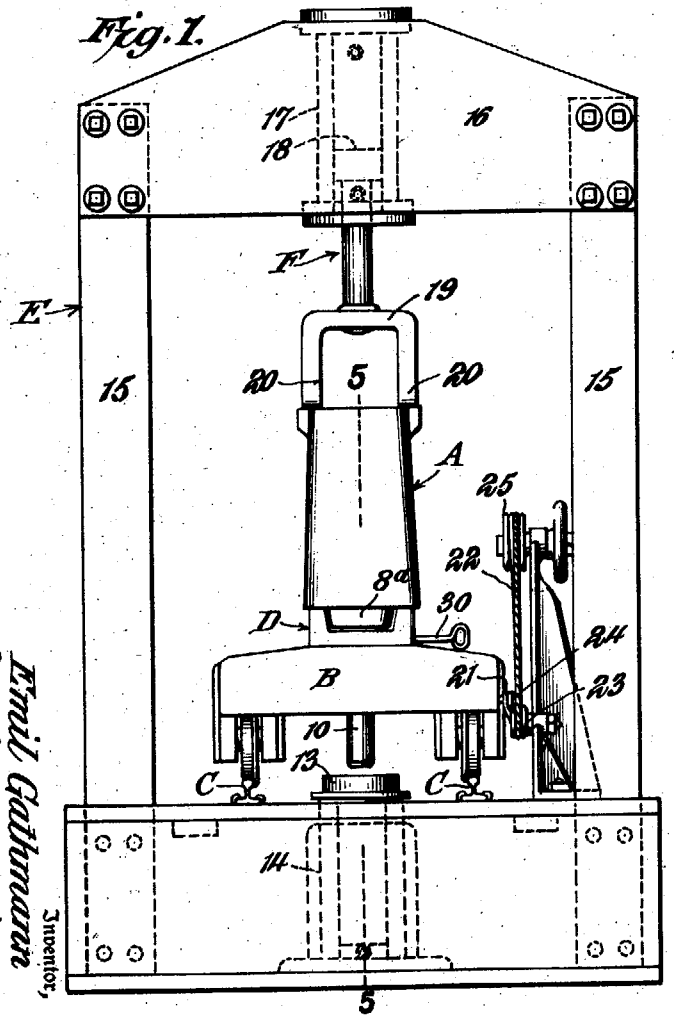
Figure 1 is a view in end elevation of stripping apparatus embodying the invention.

The molds employed in carrying out my invention may be of any suitable big-end-up kind having bottom openings, but are preferably of the kind known in the art as the Gathmann big-end-up mold. The accompanying drawings illustrate Gathmann big-end-up molds A positioned on a support or transfer car B arranged to run on tracks C—C by means of which the mold may be readily transported from the teeming location near the melting furnace to the stripping location near the soaking pit. Although only four molds are shown on the car B, it will be understood that in practice any number of molds within reasonable limits may be placed on a single car.

The molds A are necked in near their bottoms as at 1 and the bottom of the molds are formed each with a tapered opening 2 in which are seated spaced upper and lower refractory closure plugs 3 and 4, the lower plug 4 being spaced above the bottom face of the mold. These plugs together constitute a double closure for the mold bottom opening, the arrangement being such that any leakage of molten metal past the plug 3 resulting from its being slightly damaged during its insertion in the opening, will be arrested by the plug 4 and no damage will occur.

The car B is provided with a plurality of tapered openings 5 which receive the downwardly extending tapered portions 6 of a plurality of removable mold stools D. Each stool D is formed with spaced raised portions 7—7 extending along the upper face of the stool at opposite sides thereof, these raised portions being adapted to engage spaced shoulders 8—8 at opposite sides of the bottom of a mold for supporting the latter. The inner faces of the raised portions 7—7 are tapered along their inner faces to cooperate with tapered sides of a depending portion $8^a$ on the mold bottom in the positioning of the mold on the stool. The depth of the depending portion $8^a$ of the mold bottom is less than the height of the raised portions 7—7 of the associated stool, whereby a clearance space is provided between the mold bottom and the stool, this space providing for the circulation of air up through the mold bottom opening 2 and through the space between the mold and a partially stripped ingot, to promote cooling of the latter. Each stool D is provided with an opening 9 in which a stripper rod 10 is mounted for vertical sliding movements substantially coaxially with respect to the mold. It is desirable that the aforementioned parts be of rugged construction; and for this reason both the stool and stripper rod are preferably of cast metal, the opening in the stool being unmachined and used as cast. For this reason considerable clearance is provided between the rod and opening to assure free working movements.

Each stripper rod 10 is provided at its upper end with an enlarged head $10^a$, the lower face of which is tapered inwardly and downwardly as at 11 for engagement with a tapered seat 12 formed in the top of the associated stool at the upper end of the opening 9 therein. It will be observed that when the stripper rod is in its normal inactive position as shown in Figure 2 the rod will be supported by the engagement of the head with the seat 12.

In order to facilitate the centering of the mold with respect to the stripper rod, I so arrange the head $10^a$ that it will extend above the car top when supported on the seat 12 and I make the diameter of the head considerably less than the diameter of the lower portion of the mold bottom opening. When it is desired to position a mold on the car preparatory to teeming, the mold is lifted by an overhead crane and then lowered on the car in such a way that the mold bottom opening will be disposed substantially concentrically with the stripper rod head, the latter serving as a guide for accurately locating the mold.

After the mold has been thus positioned on the car the closures 3 and 4 are then positioned in the mold bottom opening and the mold teemed. It will be noted that, when the closures 3 and 4 are in place, the plug 3 is disposed above and out of contact with the plug 4, while the latter is disposed above and out of contact with the stripper rod head. This arrangement assures proper seating of the closures and effective sealing of the mold. By making the closures separate from the stripper rod no trouble will be encountered because of the sticking of the rod to the ingot. The car is then moved to the stripping station and positioned with the stripper rod disposed directly above a hydraulic ram 13 mounted for vertical movements in a hydraulic cylinder 14 which is preferably set in the floor.

It is necessary that the mold and car be held against vertical movement during the stripping operation. For this purpose, I provide a frame E comprising spaced uprights 15—15 disposed on opposite sides of the track C—C and cross pieces 16—16 connected to the uprights and extending across the track and above the ram 13, and a mold holding or hold-down or pressing device F mounted for vertical sliding movements in a hydraulic cylinder 17 secured to the cross piece of the frame. The mold holding device F comprises a double-acting hydraulic ram 18 to the lower end of which is secured an inverted U-shaped member 19 having spaced leg portions 20 adapted to engage opposite sides of the top face of a positioned mold. When the car and supported molds have been positioned so that the stripper rod of one stool is positioned approximately over the lower hydraulic ram 13, hooks 21—21 on the free ends of a cable 22, which passes around a pair of spaced pulleys 23—23, are connected to studs 24—24 on the car and the cable then operated by any suitable means such as a drum 25 in order to move the car to accurately position one mold under the holding device F. Fluid, under pressure, is then admitted to the top of the cylinder 17 causing the holding device to move downwardly substantially coaxially with respect to the mold until the spaced portions 20—20 engage the top face of the mold thereby pressing downwardly on the latter and holding it against upward movement.

When the mold has been thus anchored the ram 13 is caused to be moved up by the action of fluid under pressure supplied to the cylinder 14. During the upward movement of the stripper rod, its head will engage the plug 4 and further movement will raise the ingot I until the upper end portion thereof is extended above the top of the mold as shown in Figures 5 and 6.

In order to maintain the ingot in this partially stripper position so as to permit its upper end being engaged by a tongs or other lifting device to complete the stripping operation at another part of the plant, I provide means for locking the stripper rod in its raised position after the ram 13 has been retracted. In the illustrated embodiment of the invention I have provided a latch 26 pivoted as at 27 to the stool D. This latch 26 is adapted to ride in a longitudinal slot 28 in the stripper rod and to seat in a recess 29 at the lower end of the slot when the rod has been raised. A spring-pressed handle 30, extending through an opening 31 in the side of the stool D and being pivoted to the latch as at 32 provides for the convenient disengagement of the latter from its cooperating recess 29.

In operation, when the rod and ingot have been raised in the manner described, the latch will automatically seat in the recess 29 and will thereby retain the rod and ingot in raised position, permitting lowering of the ram without lowering of the ingot.

Since the stripper rod and latch mechanism are both carried by the stool, as distinguished from being mounted on the car itself, the stool, stripper rod, and latch mechanism are together removable from the car as a unit which unit may be readily replaced in case any of the mechanism should be damaged by the rough usage to which it must necessarily be exposed.

The holding device F is then raised by admitting fluid under pressure underneath the double-acting ram 18 and the cable 22 is operated to position the next adjacent stripper rod over the ram 13. The holding device is then moved downwardly into engagement with the newly positioned mold and the contained ingot partially stripped therefrom in the same manner as was the first. This procedure is followed until all of the ingots have been partially stripped from their associated molds and the car is then moved to the desired location where the ingots may be lifted completely out of the molds.

The foregoing is a description of the procedure followed in stripping big-end-up ingots, having no shrink head portion, from big-end-up molds. In stripping an ingot which is provided with a shrink head portion, the ram 13 can, if desired, be moved upwardly only sufficiently to loosen the ingot from its initial contact with the mold walls, and the stripper rod will then be permitted to return to its normal position, i. e., with the head 10*a* seated on the stool. The shrink head portion of such an ingot as cast projects above the mold top and it is therefore not always necessary to raise the body of the ingot above the mold, since the tongs may readily engage the shrink head portion. However, it is in all cases desirable to raise even such ingots somewhat, since doing so provides a space between the mold walls and the ingots permitting the circulation of air around the ingots and effects a desirable accelerated rate of cooling. Furthermore, my apparatus can be used to considerable advantage in the stripping of ingots of this class, since the initial slight lifting of an ingot overcomes any sticking relation between the ingot and mold and thus renders subsequent lifting of the ingot with tongs more easy.

Although means for stripping Gathmann big-end-up ingots cast with a shrink head portion are well known, I believe the present invention to provide the first method and apparatus for efficiently loosening, raising, and locking in raised position within the mold a big-end-up ingot so that its upper portion may be gripped by tongs at a location remote from the apparatus for effecting the upward movement of the ingot. When stripping ingots in accordance with my improved method it is not necessary to move the mold horizontally with respect to the support as when practicing the method disclosed in my prior Patents 1,059,667 and 1,059,668 referred to above. Essentially my improved method consists in applying positive dynamic downward pressure on the mold and relative upward pressure on the lower portion of the contained ingot, these pressures being caused to act in straight line vertical directions substantially coaxial with said mold, and without moving said mold and contained ingot horizontally relative to said support.

My improved apparatus is thus applicable to the stripping of both kinds of big-end-up ingots, namely, big-end-up ingots cast with a shrink head and those cast without a shrink head. My apparatus is simple and of such arrangement that the various parts may be of the rugged construction necessary in steel plant practice.

A jag of molds, as set up in commercial production of ingots, frequently consists of thirty to forty molds and heretofore considerable time has been required to strip the molds of such a jag. The arrangement of my apparatus and the carrying out of my invention are such that a single ram may be used for rapidly raising the stripping rods and ingots of an entire jag, although several rams may be set up together as a unit when it is desired to attain greater speed in the stripping operation, particularly where double rows of molds are carried by the cars.

Heretofore, because of the high costs of stripping big-end-up ingots cast without a shrink head, few ingots of this kind have been cast on cars. By means of my invention such ingots may be stripped rapidly and economically, and the field for the use of the big-end-up mold, and consequently the field for the production of the best quality ingots, is thus greatly broadened.

I claim:

1. An apparatus for stripping an ingot from an ingot mold having an opening in its bottom and a movable closure for said opening, comprising a mold support, a frame above said support, a holding device mounted on said frame, means operatively connected to said holding device for moving the latter downwardly substantially coaxially with said mold and into positive engagement with the upper face of the mold to prevent upward movement thereof, and vertically movable means mounted on said support and substantially coaxial with said holding device and adapted to engage said closure for moving the latter and the ingot upwardly with respect to said mold and holding device.

2. An apparatus for stripping an ingot from an ingot mold having an opening in its bottom and a movable closure for said opening, comprising mold support, a frame above said support, a holding device mounted on said frame, means operatively connected to said holding device for moving the latter downwardly substantially coaxially with said mold and into positive engagement with the upper portion thereof to prevent its upward movement, means to position said support and said mold under said holding device, and vertically movable means mounted directly under said holding device an being engageable with the closure of a mold positioned under the holding device for moving the latter and the ingot upwardly with respect to said mold and holding device.

3. An apparatus for stripping an ingot from an ingot mold having an opening in its bottom and a movable closure for said opening, comprising a frame, a support adapted to position and support a mold under said frame, a hold-down device mounted on said frame for downward movement substantially coaxially with a mold on said support and into direct positive engagement with the upper portion of said mold, and means mounted below said hold-down device and the mold on said support and being movable upwardly into engagement with said closure for moving the latter and the ingot upwardly with respect to said mold and hold-down device.

4. An apparatus for stripping an ingot from an ingot mold having an opening in its bottom and a movable closure for said opening, comprising a frame, a support adapted to position and support a mold under said frame, a hold-down device mounted in said frame for downward movement substantially coaxially with a mold on said support and having spaced portions adapted to positively engage the top face of a positioned mold, means operatively connected to said hold-down device for moving the latter downwardly to bring said spaced portions into direct positive engagement with said mold, and a stripper rod mounted below said holding device and the mold on said support and being movable upwardly from a normal position of non-engagement into engagement with said closure for moving the latter and the ingot upwardly with respect to said mold and hold-down device.

5. An apparatus for stripping an ingot from an ingot mold having a necked in opening in its bottom and a movable closure for said opening, comprising a frame, a support adapted to position and support a mold under said frame, a mold hold-down device mounted in said frame for downward movement substantially coaxially with said mold and having spaced portions adapted to engage the top face of a positioned mold, means operatively connected to said hold-down device for moving the latter downwardly to bring said spaced portions into direct positive engagement with said mold, a stripper rod mounted below said hold-down device and the mold on said support and being movable upwardly into engagement with said closure for moving the latter and the ingot upwardly with respect to said mold and hold-down device, and means for retaining the stripper rod and ingot in elevated position.

6. In an apparatus for stripping ingots from ingot molds, the combination of a mold support, a frame above said support, a mold hold-down device mounted on said frame above said support for vertical straight-line movement substantially coaxially with a mold on said support to engage the upper end face of said mold, and a stripping device mounted on said mold support below said hold-down device and being movable upwardly to push the contained ingot partially through the mold while the latter is held down by said hold-down device.

7. In an apparatus for stripping ingots from ingot molds, the combination of a mold support, a frame above said support, a mold hold-down device mounted on said frame above said support for straight-line vertical movement toward and substantially coaxially with a mold on said support, said device having spaced portions adapted to engage the upper end face of said mold on opposite sides thereof, and a stripping device mounted below said hold-down device and said mold for movement upwardly to push a contained ingot partially through the mold while the latter is held down by said hold-down device.

8. In apparatus for stripping ingots from ingot molds, the combination of a frame, a mold hold-down device mounted for vertical movement on said frame, a car mold support mounted for horizontal movements into and out of the path of said hold-down device for positioning a supported mold below said hold-down device for engagement by the latter, and mechanism mounted in fixed relation to said frame and including an element mounted for substantially straight line movements parallel with and adjacent the line of movement of said car, means connected to said element for driving it, and a detachable connection between said element and said car.

9. In apparatus for stripping an ingot from a big-end-up necked-in bottom mold, the bottom opening of which is closed by a separable closure of larger horizontal cross sectional area than the said opening, the combination of a car support for said mold having an opening with which the opening in the mold bottom is adapted to register; a stripper rod mounted for sliding movement in the opening in said support, means on said support and cooperating with said stripper rod for supporting the latter in a normal inactive position below and out of contact with said mold closure; and means independent of and below the stripper rod for moving said rod through said openings into contact with the mold bottom closure to move the ingot vertically upward with respect to the mold.

10. In apparatus for stripping an ingot from a big-end-up necked-in open bottom mold, the bottom opening of which is closed by a separable closure of larger horizontal cross sectional area than the said opening, the combination of a car support for said mold having an opening with which the opening in the mold bottom is adapted to register; a stripper rod mounted for sliding movement in the opening in said support, means on said support and cooperating with said stripper rod for normally supporting it below and out of contact with said mold closure; means independent of and below the stripper rod for moving said rod through said openings into contact with the bottom closure to move the ingot vertically upward with respect to the mold, and independent locking means engageable with said rod when in elevated position for maintaining an ingot in elevated position when the mold is moved from said stripping apparatus.

11. In apparatus for stripping an ingot from a big-end-up mold having a necked-in opening in its bottom and a separable closure for said opening, the combination of a car support for said mold having an opening with which the opening in the mold bottom is adapted to register; a stripper rod mounted for vertical sliding movement in the opening in said support and having a head adapted to seat upon said support for normally maintaining said rod in an inactive position with its upper end portion extending above said support and into the opening in said mold but below and out of contact with the said mold closure; and means independent of and below the stripper rod for moving said rod through said openings to engage said closure and to move the ingot vertically upward with respect to the mold.

12. In apparatus for stripping an ingot from a big-end-up mold having a necked-in opening in its bottom and a separable closure for said opening, the combination of a car support for said mold having an opening with which the opening in said mold bottom is adapted to register, said support being provided with a tapered seat at the upper end of the opening therein; a stripper rod mounted for free vertical sliding movements in the opening in said support and having an enlarged head substantially smaller in cross section than the opening in said mold bottom, the under side of said head being tapered for engagement with said tapered seat whereby said rod, upon being lowered, is self-centering with respect to the opening in said support and the head projecting above the support when seated; and lifting means separate from and below said rod and engageable therewith for moving said rod through said openings to engage said separable mold bottom closure and to move the ingot vertically upward with respect to the mold.

13. An apparatus for stripping an ingot from a big-end-up ingot mold having a necked-in opening in its bottom and a separable closure for said opening, comprising a car support for said mold, means for holding the mold during the stripping operation, said car support having an opening with which the opening in said mold bottom is adapted to register, said support being provided with a tapered seat at the upper end of the opening therein; a stripper rod loosely mounted for sliding movements in the opening in said support and having an enlarged head substantially smaller in cross section than the opening in said mold bottom, the upper face of said head being normally disposed below and out of contact with the separable mold bottom closure and the under side of said head being tapered for engagement with said tapered seat in said support, whereby said stripper rod, upon being lowered, is self-centering with respect to the opening in said support; lifting means mounted below and separable from said stripper rod and engageable therewith for moving said rod through said openings to engage said mold bottom closure and to move the ingot vertically upward with respect to the mold; and a latch automatically engageable with said rod for maintaining the rod ingot in elevated position after said lifting means is disengaged from said rod.

14. In apparatus for stripping an ingot from an ingot mold having a bottom opening, the combination of a support for the mold having an opening in line with the bottom opening of the mold, a vertically movable stripper rod extending through the opening in the support and having a headed portion adapted to move into and out of the bottom opening of the mold and which in its lowermost position projects above and rests upon the top of the support, a frame above said support, a mold hold-down device mounted on said frame above said support for movement substantially coaxially with a supported mold into positive engagement with the upper portion of said mold to oppose upward movement thereof, and means mounted below said support and being engageable with the stripper rod for raising the latter.

15. In apparatus for stripping an ingot from an ingot mold having a bottom opening, the combination of a support for the mold having an opening in line with the bottom opening of the mold, a vertically movable stripper rod extending through the opening in the support and having a headed portion adapted to move into and out of the bottom opening of the mold and which in its lowermost position projects above and rests upon the top of the support, a frame above said support, a holding device mounted above said support on said frame for vertical movement towards and substantially coaxially with a supported mold and having spaced portions adapted to positively engage opposite sides of the top face of said mold to oppose upward movement thereof, and means mounted below said support and being engageable with the stripper rod for raising the latter.

16. In apparatus for stripping an ingot from a big-end-up mold having a bottom opening closed by a separable closure of larger cross-sectional area than said opening and which is disposed above the bottom of said opening, the combination of a support for said mold having an opening with which the opening in the mold bottom is adapted to register; and a stripper rod having a top of smaller diameter than said mold bottom opening mounted for vertical movements in the opening in said support and having means for holding said rod in a normal position with its top disposed above said support, within said mold bottom opening, but below and out of contact with said mold closure.

17. An apparatus for stripping an ingot from a big-end-up ingot mold having an opening in its bottom and a movable closure for said opening, comprising a mold support upon which the mold to be stripped is positioned, a frame above said support, a pressing device mounted on said frame for vertical movements downwardly substantially coaxially with said mold and into positive engagement with said mold for exerting positive downward pressure thereon, and an ingot stripper under and in line with the mold bottom opening and adapted to exert an upward pressure through said opening on the bottom of the ingot when said downward pressure is being exerted whereby to effect relative upward movement of the ingot in the mold.

18. The method of producing a metallic ingot which comprises positioning a big-end-up mold having a bottom opening on a mold support, sealing said bottom opening, pouring molten metal into said mold, allowing said metal to solidify, exerting dynamic pressure downwardly against the upper portion of said mold in a direction substantially coaxial with said mold while said mold is in the same position horizontally on said support as during pouring, causing opposing pressure to be exerted upwardly through said mold bottom opening against the bottom of the ingot while continuing to exert dynamic pressure downwardly on the mold, said downward and upward pressures being exerted when the mold is in the same position horizontally with respect to said support as when said metal was poured.

EMIL GATHMANN.